Oct. 27, 1931.  F. L. SEELEY  1,829,681
STAGING OR SEMIDECKING APPARATUS FOR AUTOMOBILE SHIPPING
Filed April 25, 1929
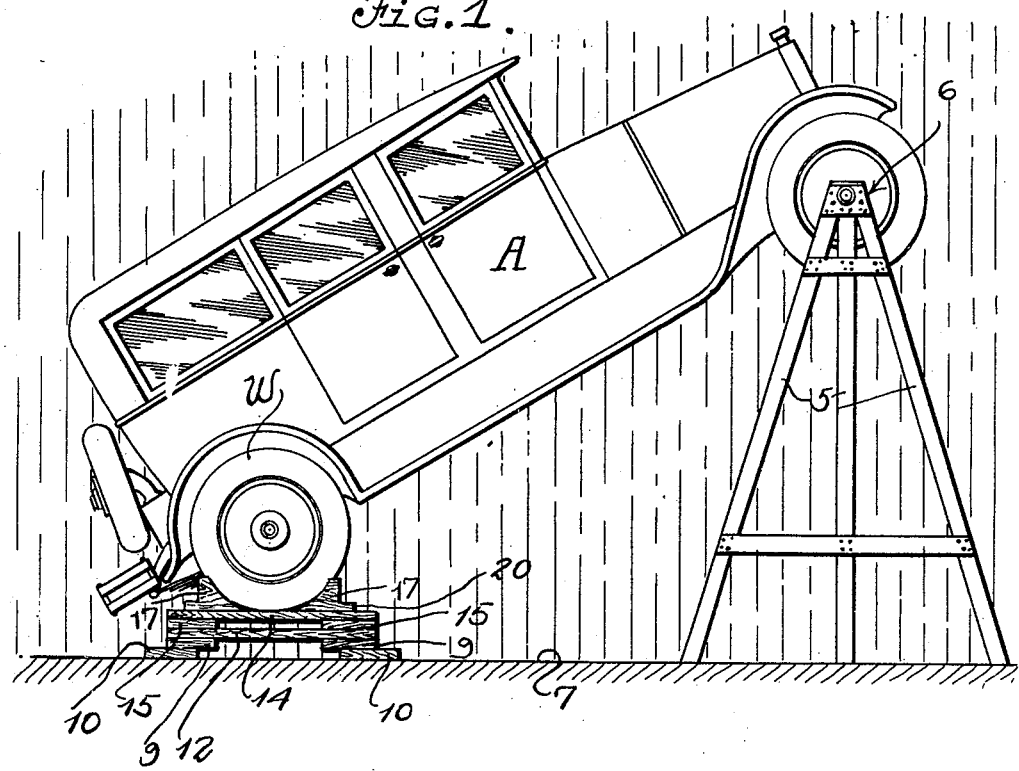
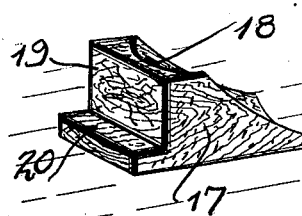
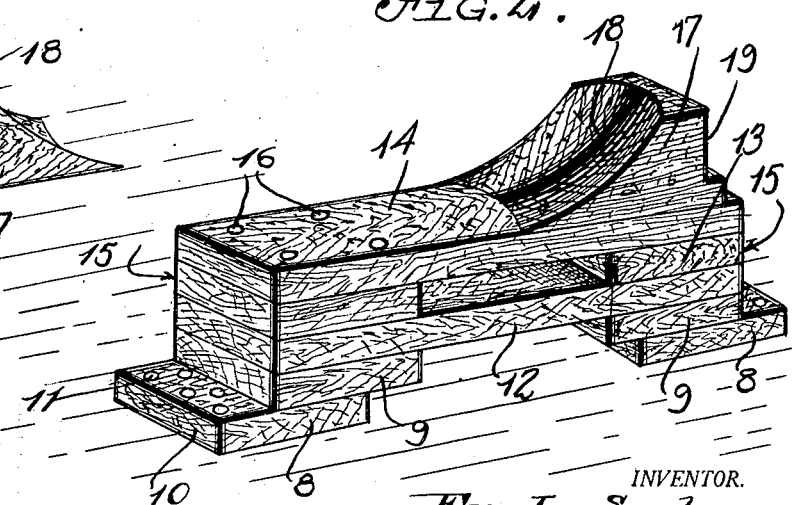
INVENTOR.
Fay L. Seeley.
BY
ATTORNEY.

Patented Oct. 27, 1931

1,829,681

UNITED STATES PATENT OFFICE

FAY L. SEELEY, OF DETROIT, MICHIGAN, ASSIGNOR TO EVANS PRODUCTS COMPANY, OF DETROIT, MICHIGAN, A CORPORATION

STAGING OR SEMIDECKING APPARATUS FOR AUTOMOBILE SHIPPING

Application filed April 25, 1929. Serial No. 358,037.

This invention relates to certain new and useful improvements in staging or semi-decking apparatus for automobile shipping.

In the employment of decking apparatus in the shipment of automobiles in railroad rolling stock, where the automobile is elevated at one end and transported in an inclined condition for the purpose of occupying a minimum of space in a car, it has been found that in such practice, the rear projecting ends of the rear springs as well as mud guards and bumpers are moved into contact with the floor of the car resulting in injury to these parts and it is therefore the primary object of this invention to provide an improved form of semi-decking or support to raise the wheels of the lower end of the car when in inclined position above the floor line so that when the automobile is tilted or inclined, the rear projecting ends of the rear springs, mud guards and bumper bars will be spaced from the car floor with injury thereto eliminated.

The elevating means for the lower end of the vehicle is in the form of a semi-decking device and being constructed of superposed layers of any suitable material has wheel chock blocks of the conventional type mounted at its upper end for supporting the wheel in position upon the semi-decking device in the same manner that the wheel blocks are used when the cars are loaded on a car floor.

With the above and other objects in view that will become apparent as the nature of the invention is better understood, the same consists in the novel form, combination and arrangement of parts hereafter more fully described, shown in the accompanying drawings and claimed.

In the drawing:—

Figure 1 is a side elevational view of a motor vehicle supported in an inclined position upon decking and semi-decking devices showing the lower end of the vehicle disposed above the car floor with the rearwardly projecting parts of the vehicle spaced from the floor line;

Figure 2 is a perspective view of the chock or semi-decking device for the lower end of the vehicle with one of the chock blocks removed therefrom; and Figure 3 is a perspective view of one of the conventional forms of chock blocks.

The loading or decking apparatus for shipping the automobile A is illustrated in Figure 1, the automobile being supported with one end thereof, preferably the forward end in an elevated position for the conservation of packing space in a railroad car, the decking frame 5 comprising a plurality of legs converging upwardly and provided at their upper ends with a bearing block 6 for the front axle or wheel hub of the automobile as illustrated. The rear end of the automobile is supported in a position raised above the floor line 7 of the car body by a semi-decking device or elevated construction.

The semi-decking construction is designed to provide a support for the rear wheel W of the automobile so that when the automobile is in the tilted or inclined position shown in Figure 1, the rear projecting ends of the wheel mud guards, bumper bars and spring ends are spaced from the floor to prevent injury thereto during shipment.

The semi-decking construction for the rear wheel as shown in detail in Figures 2 and 3, is cheap in manufacture by employing salvaged blocks or lumber in combination with longer or strip material, the construction comprising base blocks 8 preferably of rectangular formation in plan view having similarly formed blocks 9 mounted thereon in overlapping or overhanging stepped relation to provide heel portions 10 on the base blocks 8 accommodating the passage of floor anchoring devices 11, such as nails or screws for securing the chock construction upon the floor 7 of the car. A long strip or board 12 is placed on the blocks 9 and upon the ends of which short, or substantially rectangular blocks 13 are mounted. A second long strip or board 14 is mounted upon the short blocks 13 with the outer ends of the boards 12 and 14, and blocks 9 and 13 being flush and extending in the same vertical plane as indicated by the reference numeral 15. The several boards and blocks are secured together by fastening devices such as nails or the like as indicated by the reference numeral 16 in Figure 2 to present a rigid structure.

A chock block 17 such as is customarily used in loading automobiles, is mounted upon each end of the top board 14, each chock block having a curved tire supporting face 18 with the outer end wall 19 thereof cut away to provide a heel 20 to facilitate the nailing of the chock block to the semi-decking construction comprising the several layers.

The chock blocks 17 are placed on the upper board 14 with the grooved tire engaging faces 18 thereof in opposed relation for the support of the automobile tire W as shown in Figure 1, a semi-decking construction being disposed beneath each rear or lower wheel of the automobile. When the automobile is in the inclined position illustrated, and mounted upon the semi-decking construction, the rear ends of the mud guards, bumper bars and leaf springs are far enough removed from the floor line 7 of the tires so that injury to these parts is eliminated. It has been found that when automobiles are tilted for shipment, the parts thereof above noted are quite frequently damaged and it is therefore the object of this invention to provide a new and novel semi-decking construction for raising the lower end of a tilted automobile during shipment. A semi-decking construction of this character can be inexpensively manufactured by employing salvaged material to be used as the relatively short or substantially rectangular blocks in combination with the longer strips or boards as illustrated. The stepped arrangement of the two lower short blocks of the semi-deck provides end extensions for anchoring the same to a car floor while the end heels upon the chock blocks provide means for anchoring them to the upper board of the device. This arrangement also possesses resiliency to a certain extent in view of the intermediate open spaces between the short blocks as well as the intermediate space between the long strips or boards that offer to a certain extent, a cushioned support for the lower elevated end of the automobile. While one particular form of chock block has been shown and described, it is to be understood that any conventional form of wheel anchoring block may be employed, the invention primarily residing in the provision of means for raising or holding the lower end of a motor vehicle that is inclined during shipment, elevated from the floor of the railroad car. Also, while one form of elevating means or semi-decking device is illustrated, it is to be understood that the gist of this invention will include other and modified forms of elevating means. The height of the semi-decking device may be varied by the addition of other blocks and strips until the desired height is attained. Strips and blocks of different dimensions may be employed such as 1" x 6" or 2" x 6" material, or other dimensions, thereby controlling the built up formation illustrated in Figures 1 and 2 as to the desired number of blocks and strips required to procure the preferred elevation.

While there is herein shown and described the preferred embodiment of the present invention, it is nevertheless to be understood that minor changes may be made therein without departing from the spirit and scope of the invention as claimed.

I claim:—

1. A semi-decking construction for supporting the lower end of a motor vehicle that is inclined on decking apparatus during shipment, comprising a semi-decking member having an upper face for supporting the tire on the lower end of the vehicle with the downwardly extended parts of the lower end of the vehicle spaced from the car floor, the semi-decking member including a plurality of superposed layers to form an elevated structure with the lower layers extended outwardly to provide anchoring heels for the member.

2. A semi-decking construction for supporting the lower end of a motor vehicle that is inclined on decking apparatus during shipment, comprising a semi-decking member having an upper face for supporting the tire on the lower end of the vehicle with the downwardly extended parts of the lower end of the vehicle spaced from the car floor, the semi-decking member including a plurality of layers to form an elevated structure with the lower layers extended outwardly to provide anchoring heels for the member, two of said layers being of elongated form, and the remaining layers being of rectangular block formation providing spaces between the ends of the member permitting intermediate flexing movement of the member.

3. A semi-decking construction for supporting the lower end of a motor vehicle that is inclined on decking apparatus during shipment, comprising a semi-decking member having an upper face for supporting the tire on the lower end of the vehicle with the downwardly extended parts of the lower end of the vehicle spaced from the car floor, the semi-decking member including a plurality of layers to form an elevated structure with the lower layers extended outwardly to provide anchoring heels for the member, two of said layers being of elongated form, the remaining layers being of rectangular block formation providing spaces between the ends of the member, and grooved wheel blocks on the upper layer.

4. A semi-decking construction comprising a pair of spaced base blocks, a block on each base block in inwardly overlapped relation, an elongated board on the second named blocks, another block on each end of the board, a second elongated board on the last named blocks, the outer ends of said blocks and board, except the base blocks being in the same vertical plane and a grooved wheel block on each end of the upper board.

In testimony whereof I affix my signature.

FAY L. SEELEY.